United States Patent
Kurosaki

(10) Patent No.: US 9,971,236 B2
(45) Date of Patent: May 15, 2018

(54) PROJECTOR HAVING TWO DIFFUSION PLATES

(71) Applicant: CASIO COMPUTER CO., LTD., Shibuya-ku, Tokyo (JP)

(72) Inventor: Hideyuki Kurosaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/296,410

(22) Filed: Oct. 18, 2016

(65) Prior Publication Data
US 2017/0184952 A1    Jun. 29, 2017

(30) Foreign Application Priority Data

Dec. 24, 2015 (JP) ................................ 2015-250857

(51) Int. Cl.
G03B 21/20 (2006.01)
G02B 3/00 (2006.01)
G02B 5/02 (2006.01)
G02B 27/14 (2006.01)

(52) U.S. Cl.
CPC ......... *G03B 21/208* (2013.01); *G02B 3/0006* (2013.01); *G02B 5/0278* (2013.01); *G02B 27/141* (2013.01); *G02B 27/145* (2013.01)

(58) Field of Classification Search
CPC .. G02B 27/141; G02B 27/145; G02B 3/0006; G02B 5/0278; G03B 21/208
See application file for complete search history.

(56) References Cited

U.S. PATENT DOCUMENTS

| 2001/0052955 A1* | 12/2001 | Nagatani | G02F 1/133621 349/65 |
| 2003/0039036 A1* | 2/2003 | Kruschwitz | G02B 27/0927 359/707 |

FOREIGN PATENT DOCUMENTS

| JP | 2003098476 A | 4/2003 |
| JP | 2012073489 A | 4/2012 |
| JP | 2014032371 A | 2/2014 |
| JP | 2015145972 A | 8/2015 |
| WO | 2014199485 A1 | 12/2014 |

OTHER PUBLICATIONS

Japanese Office Action dated Aug. 31, 2017 issued in counterpart Japanese Application No. 2015-250857.

* cited by examiner

*Primary Examiner* — Sultan Chowdhury
*Assistant Examiner* — Magda Cruz
(74) *Attorney, Agent, or Firm* — Holtz, Holtz & Volek PC

(57) ABSTRACT

A projector having: a light source formed by a laser light emitting element; a first diffusion plate which light emitted from the light source is made to enter; a microlens array which light having passed through the first diffusion plate is made to enter; and a second diffusion plate which diffuses the light having passed through the microlens array.

17 Claims, 5 Drawing Sheets

PROJECTOR HAVING TWO DIFFUSION PLATES

BACKGROUND OF THE INVENTION

Field of the Invention

The present invention relates to a projector.

Description of the Related Art

Today, a data projector is commonly used as an image projector for projecting a picture on a personal computer, a video image, and an image based on image data stored in a memory card or the like on a screen. This type of projector condenses light emitted from a light source onto a digital micromirror device (DMD) or a display element such as a liquid crystal plate and displays a color image on the screen.

In this data projector, laser light emitted from a laser light source, for example, passes through a collimator lens, spreads on a diffusion plate, and enters a microlens array. The laser light is made to enter the microlens array so as to be widely applied thereto by the diffusion plate. Thereafter, the laser light is condensed by a condenser lens and is applied to a display element through a prism. The image light formed on the display element is projected on the screen by a projection optical system.

Japanese Patent Application Laid-Open No. 2015-145972 discloses a projector which diffuses laser light by using a diffusion plate and then condenses the laser light by using a condenser lens to apply the laser light to a display element. In addition, the Patent Document 1 also discloses that the light having passed through the diffusion plate is passed through a lens array having a plurality of lenses constituting an integrator optical system and then condensed by the condenser lens. According to this configuration, coherent light emitted from a light source device is diffused by the diffusion plate so as to be a luminous flux having a uniform illuminance distribution by the lens array which is an integrator optical system and is able to be applied to the display element.

Moreover, Japanese Patent Application Laid-Open No. 2012-73489 discloses a projector wherein a light source unit includes: an excitation light source which emits predetermined wavelength band light; and a light emitting plate having a fluorescence emitting section in which a phosphor layer for emitting predetermined wavelength band light is laid with the surface as a reflective surface and with light emitted from the excitation light source as excitation light and a diffusion section which diffuses and reflects the light emitted from the excitation light source. A total internal reflection (TIR) prism is arranged between the light emitting plate and the excitation light source. Light from the light emitting plate passes through the TIR prism and is applied to a display element via a microlens array, a condenser lens, and a reverse total internal reflection (RTIR) prism, and ON light from the display element is made to enter the RTIR prism again and projected on a screen via a projection optical system.

The techniques disclosed in Japanese Patent Application Laid-Open No. 2015-145972 and Japanese Patent Application Laid-Open No. 2012-73489 have a problem that the laser light enters the microlens array with an oval cross-sectional shape and therefore, in the case of a small incident range, the luminance balance deteriorates on the right and left sides of a projected picture, by which the center is light while the corners are dark and a lattice-shaped pattern appears due to an influence of diffraction of the microlens array.

An object of the present invention is to provide a light source device capable of dispersing and uniforming the illuminance distribution or the lattice pattern on the projected picture by arranging a diffusion plate on the emission side of the microlens array and to provide a projector including the light source device.

SUMMARY OF THE INVENTION

According to an aspect of the present invention, there is provided a projector including: a light source formed by a laser light emitting element; a first diffusion plate which light emitted from the light source is made to enter; a microlens array which light having passed through the first diffusion plate is made to enter; and a second diffusion plate which diffuses the light having passed through the microlens array.

DETAILED DESCRIPTION OF THE PREFERRED EMBODIMENT

Figure 1:
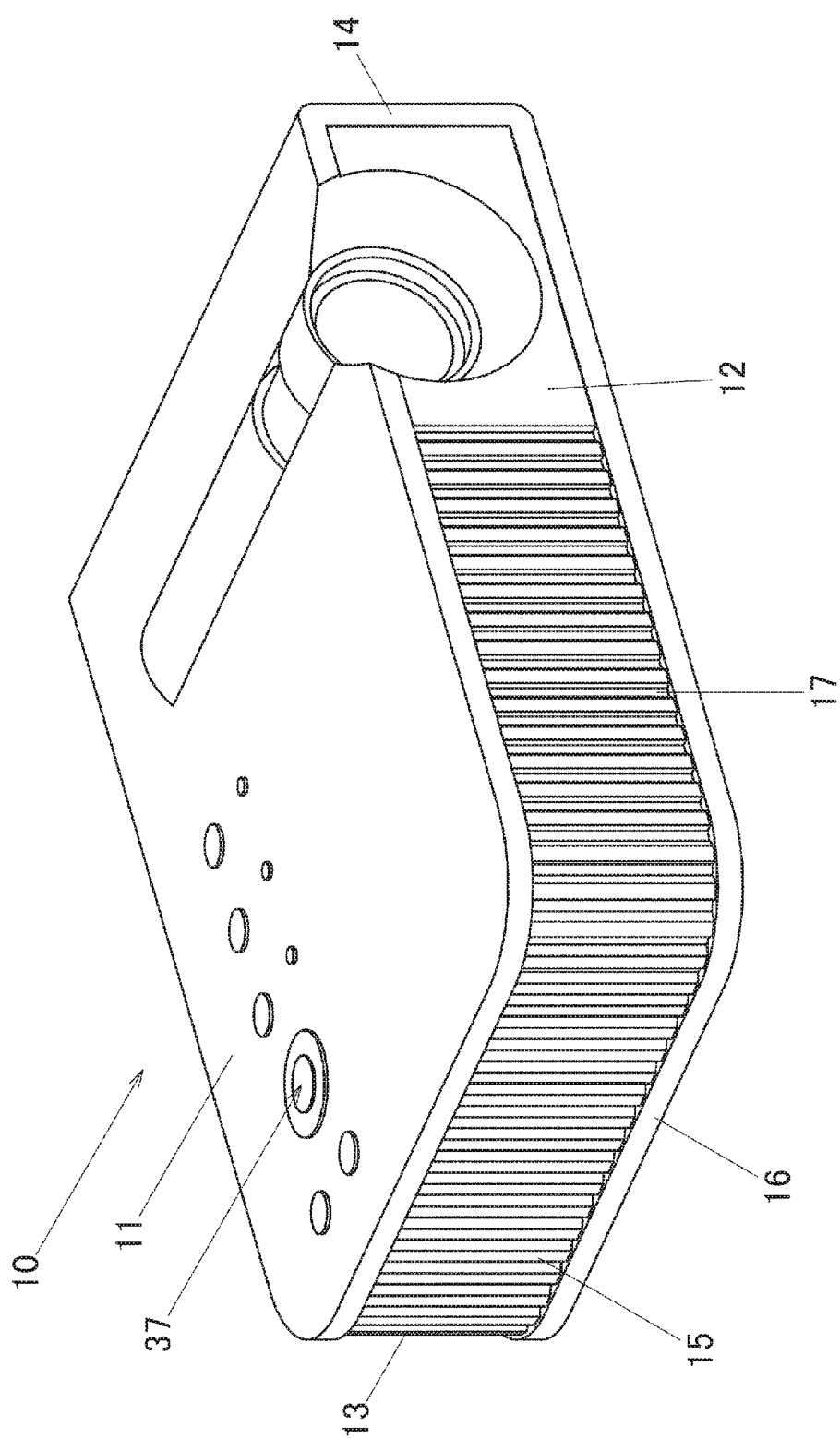
FIG. 1 is an external perspective diagram illustrating a projector according to an embodiment of the present invention.

Hereinafter, the embodiments of the present invention will be described with reference to accompanying drawings. FIG. 1 is an external perspective diagram of a projector 10. In this embodiment, term "right and left" in the projector 10 means the right and left directions with respect to the projection direction and term "front and back" means the front and back directions with respect to the screen-side direction of the projector 10 and to the moving direction of a light beam bundle.

In addition, the housing of the projector 10 has a substantially rectangular parallelepiped shape as illustrated in FIG. 1 and is formed by a side plate, a top plate 11, and a bottom plate 16, wherein the side plate includes a front plate 12, a back plate 13, a left-side plate 14, and a right-side plate 15. The projector 10 has a projection section on the left side of the front plate 12. Furthermore, the front plate 12 is provided with a plurality of intake/exhaust holes 17. In addition, the projector 10 includes an Ir receiving section, though not illustrated, which receives a control signal transmitted from a remote controller.

Moreover, the top plate 11 is provided with a key/indicator section 37. In the key/indicator section 37, there are arranged keys and indicators such as a power switch key, a power indicator for giving notice of turning on or off of a power supply, a projection switch key for switching on/off of projection, an overheat warning indicator for giving notice at the time of overheat of a light source device, a display element, or a control circuit, and the like.

Furthermore, on the back plate 13, there are provided an input-output connector section provided with a USB terminal, a D-SUB terminal for video signal input to which an analog RGB video signal is input, an S terminal, an RCA terminal, an audio output terminal, and the like, which are not illustrated, and various terminals of a power adapter plug or the like. Moreover, a plurality of intake holes are formed on the back plate 13.

Figure 2:
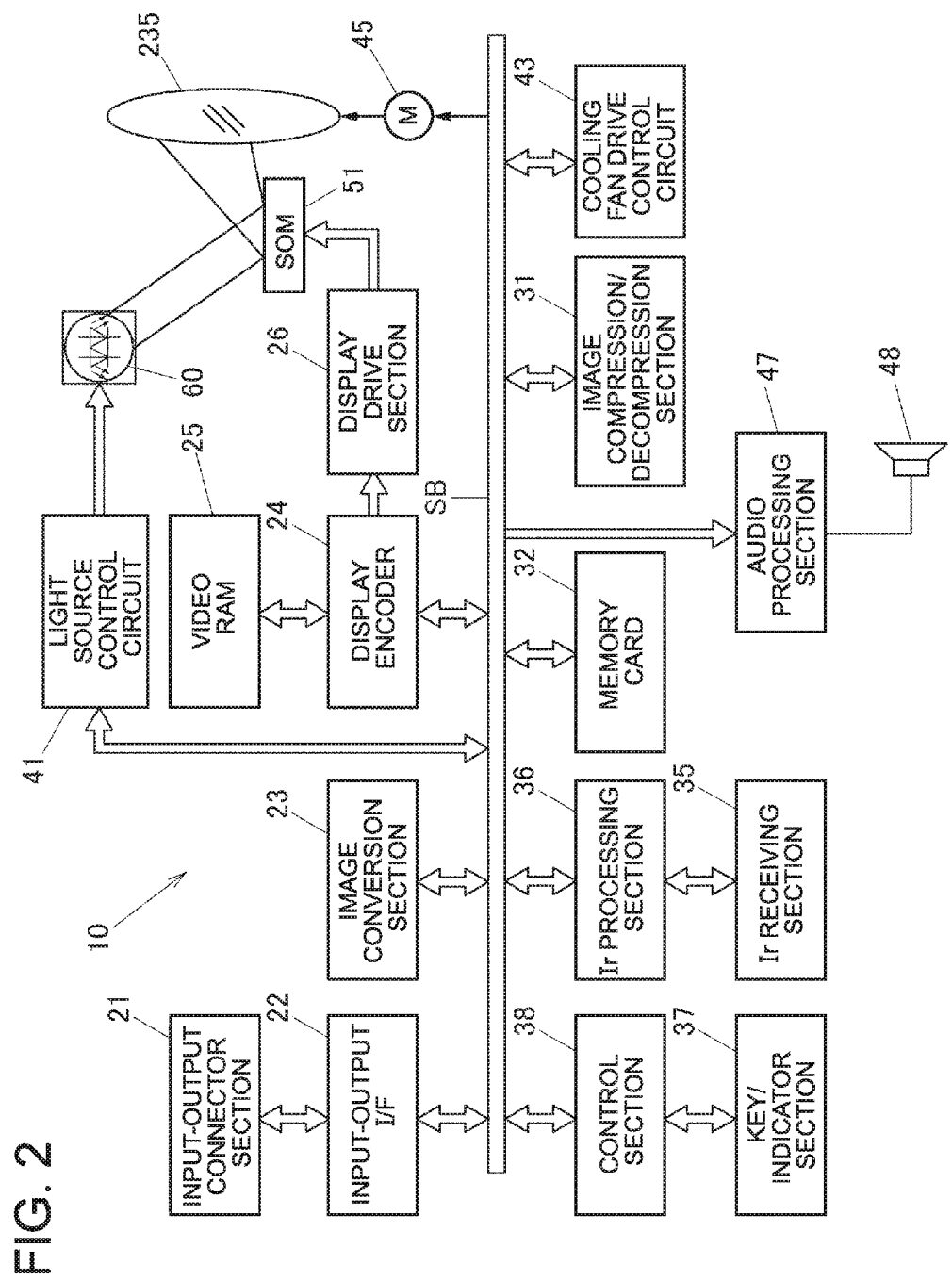
FIG. 2 is a diagram illustrating a functional block of the projector according to the embodiment of the present invention.

The following describes a projector control section which is a projector control means for the projector 10 with reference to the functional block diagram of FIG. 2. The projector control section includes a control section 38, an input-output interface 22, an image conversion section 23, a display encoder 24, a display drive section 26, and the like.

The control section 38 is used to perform the operation control of respective circuits in the projector 10 and includes a CPU, a ROM which fixedly stores operating programs for various settings or the like, a RAM used as a work memory, and the like.

Then, the projector control section outputs image signals of various standards input from the input-output connector section 21 to a display encoder 24 after the image signals are converted so as to be unified into a predetermined format suitable for the display by the image conversion section 23 via the input-output interface 22 and a system bus (SB).

Moreover, the display encoder 24 develops and stores the input image signals to a video RAM 25 and then generates video signals from the content stored in the video RAM 25 to output the video signals to the display drive section 26.

The display drive section 26, which functions as a display element control means, drives a display element 51 which is a spatial optical modulation element (SOM), appropriately at a frame rate in response to the image signals output from the display encoder 24. In addition, the projector 10 forms an optical image (image light) with light reflected on the display element 51 by applying a light beam bundle emitted from a light source device 60 to the display element 51 via a light-source-side optical system and then projects and displays an image on a screen, which is not illustrated, via a projection-side optical system. In addition, a movable lens group of the projection-side optical system is driven by a lens motor 45 for zoom adjustment or focus adjustment.

Moreover, an image compression/decompression section 31 compresses data of a luminance signal and a color difference signal of the image signal by ADCT and Huffman encoding or other processing and performs recording processing of sequentially writing the compressed data into a memory card 32 which is a detachable recording medium.

Furthermore, the image compression/decompression section 31 reads out image data recorded in the memory card 32 in a playback mode, decompresses individual pieces of image data constituting a series of motion pictures in units of a frame, outputs the image data to the display encoder 24 via the image conversion section 23, and performs processing enabling the motion pictures or the like to be displayed on the basis of the image data stored in the memory card 32.

Furthermore, an operation signal of the key/indicator section 37, which includes the main key, indicators, and the like, provided on the top plate 11 of the housing is directly sent out to the control section 38, a key operation signal from the remote controller is received by the Ir receiving section 35, and then a code signal demodulated by the Ir processing section 36 is output to the control section 38.

Incidentally, the control section 38 is connected to an audio processing section 47 via the system bus (SB). The audio processing section 47, which is provided with a sound source circuit such as a PCM tone generator, converts audio data to analog data in the projection mode and in the playback mode and drives a speaker 48 to amplify and emit sounds.

Moreover, the control section 38 controls a light source control circuit 41 as a light source control means, and the light source control circuit 41 performs individual controls for emitting red, green, and blue wavelength band light of the light source device 60 so that light of a predetermined wavelength band requested when generating an image is emitted from the light source device 60.

Furthermore, the control section 38 causes a cooling fan drive control circuit 43 to perform temperature detection with a plurality of temperature sensors provided in the light source device 60 or the like to control the rotational speed of the cooling fan on the basis of a result of the temperature detection. Moreover, the control section 38 also performs other controls such as causing the cooling fan drive control circuit 43 to maintain the rotation of the cooling fan even after turning off the power supply of the projector body by using a timer or the like or such as turning off the power supply of the body of the projector 10 on the basis of the result of the temperature detection by the temperature sensors.

Figure 3:
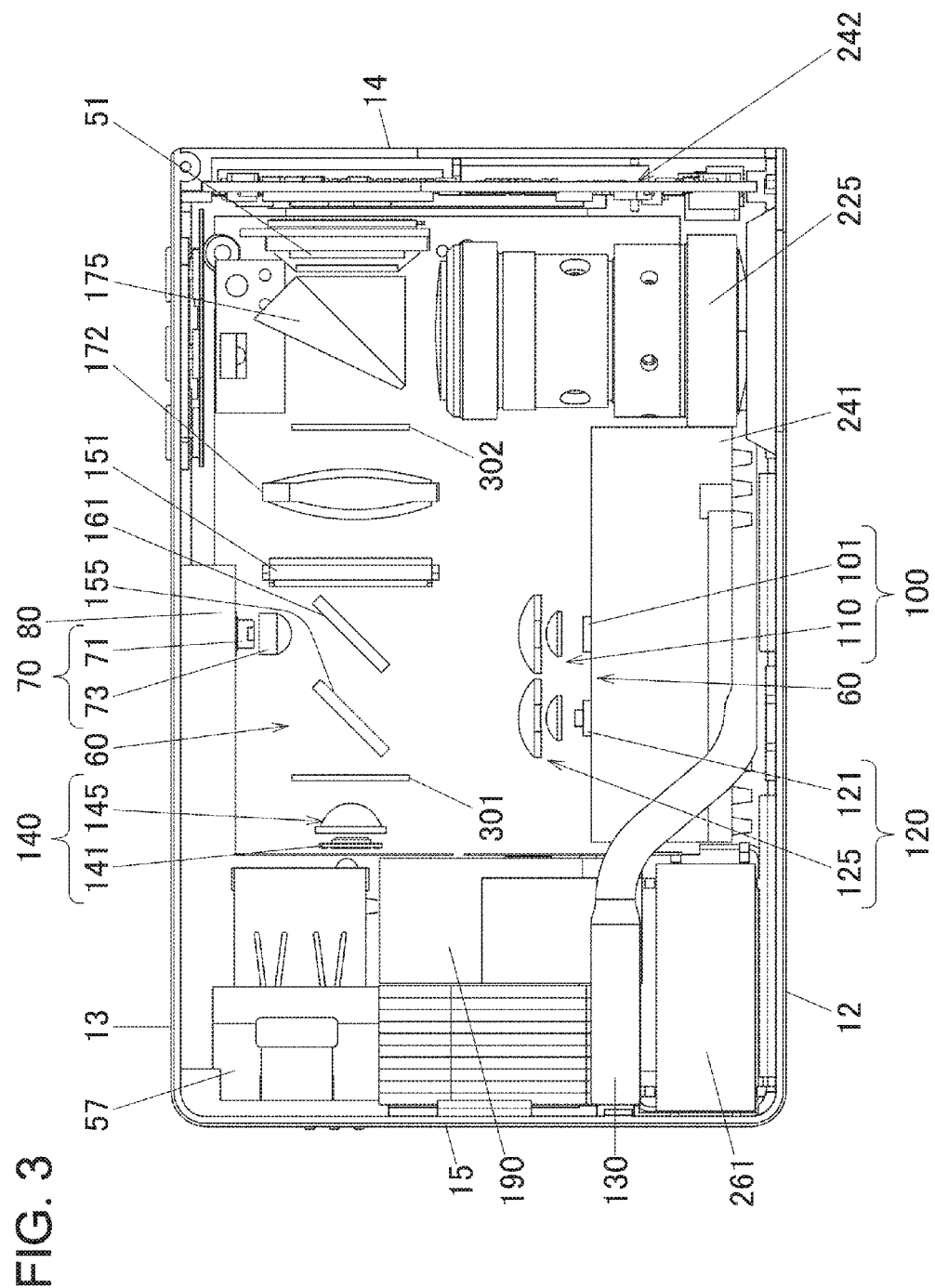
FIG. 3 is a plan schematic diagram illustrating an internal structure of the projector according to the embodiment of the present invention.

Subsequently, the internal structure of the projector 10 will be described. FIG. 3 is a plan schematic diagram illustrating an internal structure of the projector 10. As illustrated in FIG. 3, the projector 10 includes a light source unit as the light source device 60 in the center and includes a lens barrel 225 having a projection optical system therein on the left side of the light source unit. Furthermore, the projector 10 includes a display element 51 such as a DMD arranged in parallel with the left-side plate 14 between the lens barrel 225 and the back plate 13. Additionally, the projector 10 includes a main control circuit board 241 between the light source unit and the front plate 12 and includes a power supply control circuit board 242 between the lens barrel 225 and the left-side plate 14.

Furthermore, the projector 10 includes a condenser lens 172 in the light source unit to condense light emitted from the light source unit by using the condenser lens 172 so as to apply the condensed light to the display element 51 via the RTIR prism 175 and to emit the light toward the projection optical system with the optical axis of the ON light reflected on the display element 51 made to coincide with the optical axis of the projection optical system by using the RTIR prism 175.

A second diffusion plate 302 is installed between the condenser lens 172 and the RTIR prism 175, and the second diffusion plate 302 is able to diffuse the light having passed through the condenser lens 172 to apply the diffused light to the display element 51. The diffusion angle of the second diffusion plate 302 is smaller than the diffusion angle of a first diffusion plate 301.

The term "diffusion angle" means an angle width in which the intensity of emitted diffused light is a half of the maximum value (full width at half maximum) when rectilinearly propagating light such as laser light perpendicularly enters a diffusion structure. Specifically, the magnitude of the diffusion angle directly represents the magnitude of the diffusion degree. If the diffusion angle is large, the intensity is reduced even if the laser light is the same.

Furthermore, the projector 10 includes a power connector 57, a heat sink 190 for a blue light source 141 described later, a heat pipe 130 for guiding heat generated in a red light source 121 and a fluorescent plate 101 described later to the heat sink 190, and a cooling fan 261 in order from the back plate 13 side between the light source unit and the right-side plate 15.

The light source unit includes an excitation light irradiation device 70 arranged on the right side of the microlens array 151 and in the vicinity of the center of the projector 10, a green light source device formed by a fluorescent light emitting device 100 arranged in the vicinity of the cooling fan 261 and in the vicinity of the center of the projector 10, a red light source device 120 arranged next to the fluorescent light emitting device 100, and a blue light source device 140 arranged in the vicinity of the power connector 57 and in the vicinity of the back plate 13.

The excitation light irradiation device 70, which is installed in the vicinity of the center of the back plate 13, includes an excitation light source 71 which emits light in the direction of the front plate 12 with the optical axis made parallel to the left-side plate 14 and a collimator lens 73 arranged on the optical axis of the excitation light source 71. The excitation light source 71, which is a blue laser emitter, emits laser light of a blue wavelength band toward the fluorescent light emitting device 100 via a first dichroic mirror 155 arranged in front of the excitation light irradiation device 70.

The collimator lens 73 applies light emitted from the excitation light source 71 as a substantially parallel light beam bundle in such a way that the emitted light is slightly diffused. Furthermore, the excitation light source 71 is in contact with a heat sink 80 installed between the excitation light source 71 and the back plate 13 and is cooled down by the heat sink 80.

In addition, the fluorescent light emitting device 100 includes the fluorescent plate 101 and a condenser lens 110 arranged behind the fluorescent plate 101. The fluorescent plate 101, which is a square flat plate whose surface is mirror-finished, is arranged in parallel with the front plate 12. A square green phosphor layer is laid on the mirror-finished face. The green phosphor layer is formed of a binder such as silicone resin or the like high in heat resistance and transparency and a green phosphor uniformly scattered on the binder.

The fluorescent plate 101, where the phosphor layer is laid on the mirror-finished flat plate, emits fluorescent light of the green wavelength band generated from the phosphor of the phosphor layer from the same surface as the incident surface of the excitation light, with the laser light emitted from the excitation light source 71 as excitation light. Moreover, the green phosphor layer of the fluorescent plate 101 has a similar shape to that of the display element 51 and the sectional shape of the light beam bundle emitted from the green phosphor layer is approximate to the shape of the display element 51.

The red light source device 120 includes a red light source 121 whose optical axis is parallel to the right-side plate 15 and a condenser lens 125 arranged on the optical axis of the red light source 121. The red light source 121 is a red light emitting diode. Light emitted from the red light source 121 is made to be a luminous flux limited to a predetermined diffusion range by the condenser lens 125 and then emitted from the red light source device 120. The red light source 121 is cooled by the heat sink 190.

The blue light source device 140 includes a blue light source 141 whose optical axis is parallel to the back plate 13 and a collimator lens 145 arranged on the optical axis of the blue light source 141. The blue light source 141 is a blue laser diode. Light emitted from the blue light source 141 is made to be a luminous flux limited to a predetermined diffusion range by the collimator lens 145 before the light is emitted from the blue light source 141. The blue light source 141 is cooled by the heat sink 190.

A first diffusion plate 301 is installed between the collimator lens 145 and the first dichroic mirror 155. The first diffusion plate 301 diffuses and emits light to the microlens array 151.

The light source optical system of the light source unit includes a first diffusion plate 301, a first dichroic mirror 155, a second dichroic mirror 161, a microlens array 151, a condenser lens 172, and a second diffusion plate 302. The second diffusion plate 302 is provided between the microlens array 151 and the display element 51, and the second diffusion plate 302 is arranged so as to be located nearer the display element 51 than the microlens array 151.

The first diffusion plate 301 is arranged on the optical axis of a light beam bundle emitted from the blue light source device 140 to diffuse blue wavelength band light emitted from the blue light source device 140 and then to apply blue wavelength band light to the microlens array 151 via the first dichroic mirror 155 and the second dichroic mirror 161.

The first dichroic mirror 155 is installed in a position where the optical axis of the light beam bundle emitted from the blue light source device 140 intersects with the optical axis of the light beam bundle emitted from the red light source device 120 and reflects the light emitted from the red light source device 120 in the direction of the left-side plate 14 so that the emitted light is parallel to the back plate 13. The second dichroic mirror 161 is installed in a position where the optical axis of the light beam bundle emitted from the blue light source device 140 intersects with the optical axis of the light beam bundle emitted from the fluorescent light emitting device 100 and reflects the light emitted from the fluorescent light emitting device 100 in the direction of the left-side plate 14 so that the emitted light is parallel to the back plate 13. The microlens array 151 transmits light emitted from the fluorescent light emitting device 100, the red light source device 120, and the blue light source device 140.

The first dichroic mirror 155 reflects red wavelength band light and transmits blue wavelength band light. Moreover, the second dichroic mirror 161 reflects green wavelength band light and transmits red wavelength band light and blue wavelength band light.

Furthermore, blue wavelength band light of laser light emitted from the blue light source device 140 passes through the first diffusion plate 301, the first dichroic mirror 155, the second dichroic mirror 161, and the microlens array 151 so as to enter the condenser lens 172.

Furthermore, red wavelength band light which is incoherent light emitted from the red light source device 120 is reflected by the first dichroic mirror 155 and passes through the second dichroic mirror 161 and the microlens array 151 so as to enter the condenser lens 172.

Moreover, the green wavelength band light which is incoherent light emitted from the fluorescent light emitting device 100 is reflected by the second dichroic mirror 161 so as to have the same optical axis as the optical axis of the blue wavelength band light and of the red wavelength band light, and then passes through the microlens array 151 so as to enter the condenser lens 172.

In this manner, respective primary color light beams having passed through the microlens array 151 are made to enter the condenser lens 172, and the condenser lens 172 applies the primary color light beams to the image forming surface of the display element 51 so that images on respective micro-convex lenses of the microlens array 151 are superimposed on each other, by which the light beams are made to be a light beam bundle having uniform optical density, and then the light beam bundle is made to enter the display element 51 via the second diffusion plate 302.

Figure 4:
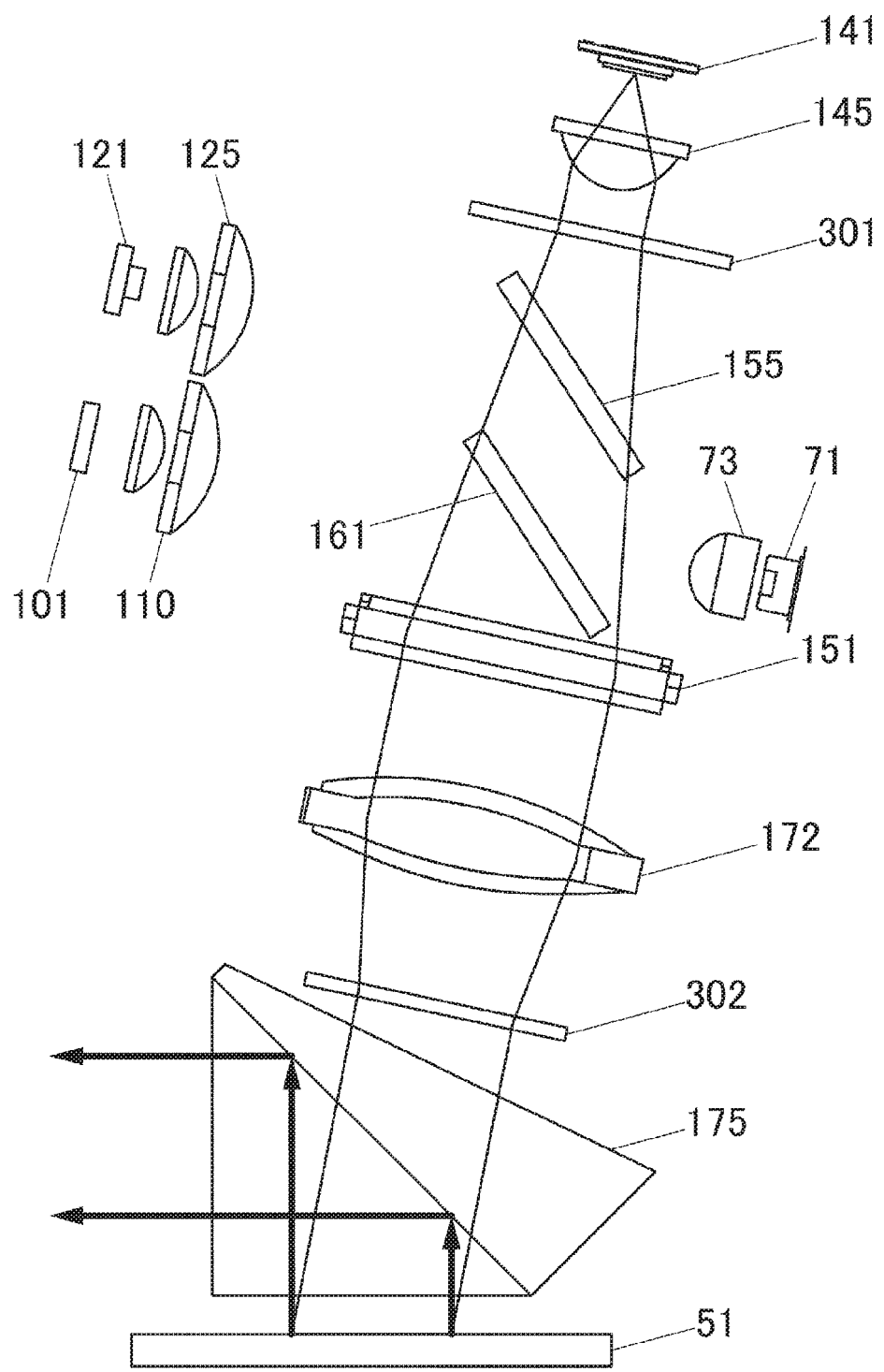
FIG. 4 is an outline diagram illustrating an optical system of the projector according to the embodiment of the present invention.

FIG. 4 is an outline diagram illustrating an optical system of the projector according to the embodiment of the present invention. Laser light from the blue light source 141 of the blue light source device 140 passes through the collimator lens 145 and is emitted. The first diffusion plate 301 is installed in the moving direction of laser light of the collimator lens 145. The laser light spreads at the first diffusion plate 301, passes through the first dichroic mirror 155 and the second dichroic mirror 161, and enters the microlens array 151.

The first diffusion plate 301 has minute irregularities formed on the surface to decrease the diffusion angle of emitted light. Decreasing the emission angle of the light emitted from the first diffusion plate 301 prevents the emitted light from extremely spreading. Irregularities minute in size are formed completely at random on the surface of the first diffusion plate 301. These minute irregularities refract transmitted light at a diffusion angle as designed. The first diffusion plate 301 has a small diffusion angle in the case of small irregularities on the surface while having a large diffusion angle in the case of large irregularities on the surface. In addition, coherent light passes through the first diffusion plate 301, thereby decreasing the coherency of the coherent light or making the coherent light incoherent.

Moreover, the red wavelength band light of the incoherent light emitted from the red light source 121 of the red light source device 120 is reflected on the first dichroic mirror 155 and is made to enter the microlens array 151.

The excitation light emitted from the excitation light source 71 of the excitation light irradiation device 70 passes through the second dichroic mirror 161 and the condenser lens 110 and is applied to the fluorescent plate 101. The green wavelength band light of the incoherent light emitted from the fluorescent plate 101 is reflected on the second dichroic mirror 161 and is made to enter the microlens array 151.

The light having passed through the microlens array 151 passes through the condenser lens 172 and then passes through the second diffusion plate 302 for improving image quality before entering the RTIR prism 175.

Thereby, the light is applied to the display element 51 in a state of a uniform illuminance distribution of the light or after the lattice pattern is diffused. The light having entered the display element 51 is applied to substantially the same range thereof as the effective range of the display element 51. The light having entered the display element 51 is reflected on the display element 51 and then reflected on the RTIR prism 175 in the directions indicated by respective arrows so as to be guided to the projection lens side.

Figure 5:
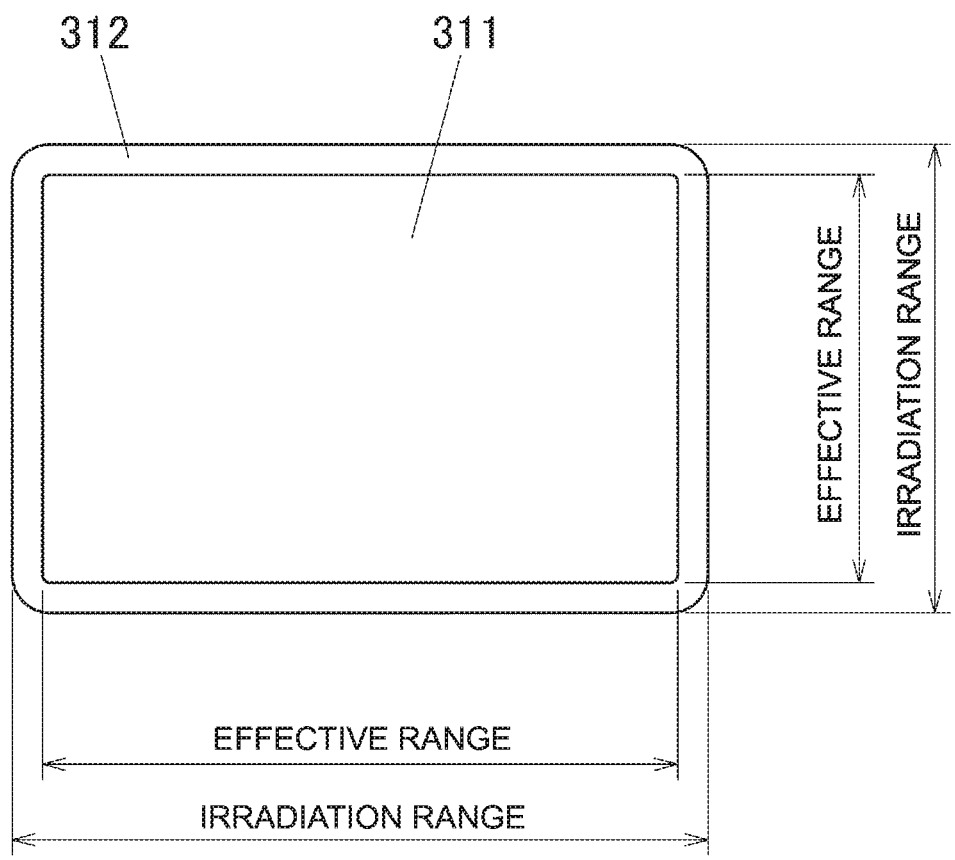
FIG. 5 is a diagram illustrating an irradiation range relative to an effective range of a display element according to the embodiment of the present invention.

FIG. 5 is a diagram illustrating an irradiation range 312 relative to an effective range 311 of the display element 51 according to the embodiment of the present invention. The effective range 311 of the display element 51 is a rectangular range, and the irradiation range 312 is a rectangular range slightly larger than the effective range 311. Although the part of the irradiation range 312 outside the effective range 311 is useless, the area thereof is small, thereby having little influence on the projected picture.

Moreover, the focal position of the transmitted light of the condenser lens 172 can be changed by adjusting the distance between the microlens array 151 and the condenser lens 172 illustrated in FIG. 4 by moving the condenser lens 172 to change the distance, and therefore even after the light passes through the second diffusion plate 302, the light can be applied only to a range approximate to the effective range.

In addition, the relation between the position of the condenser lens 172 and the position of the second diffusion plate 302 may be reversed. If, however, the condenser lens 172 is arranged on the microlens array 151 side so that the light condensed by the condenser lens 172 enters the second diffusion plate 302, the arrangement reduces the spreading of the light beam bundle having passed through the microlens array 151, by which the optical system of the light source device 60 can be easily reduced in size.

Furthermore, since the light source light is applied to the entire display element 51 by diffusing the laser light by the first diffusion plate 301 and the second diffusion plate 302 in this embodiment, the diffusion rate of the first diffusion plate 301 is able to be lowered in comparison with the case of not using the second diffusion plate 302.

In addition, for example, a red laser diode may be used as the red light source device 120 in some cases. In this case, the first diffusion plate 301 is arranged between the first dichroic mirror 155 and the second dichroic mirror 161, so that the laser light from the red light source device 120 also passes through the first diffusion plate 301 and enters the microlens array 151.

Furthermore, the excitation light source and the fluorescent light emitting device 100 may be replaced with green laser diodes in some cases. In this case, the first diffusion plate 301 is arranged between the second dichroic mirror 161 and the microlens array 151, so that blue wavelength band light and further green wavelength band light pass through the first diffusion plate 301 and enter the microlens array 151.

As described hereinabove, the second diffusion plate 302 for diffusing light is installed between the microlens array 151 and the display element 51, thereby enabling the provision of the light source device 60 capable of dispersing and uniforming the illuminance distribution or the lattice pattern on the projected picture and the projector 10 including the light source device 60.

Furthermore, the first dichroic mirror 155 and the second dichroic mirror 161 as optical axis synthesizers are provided on the incident side of the microlens array 151, thereby enabling light having a different color from the color of blue laser light to enter the microlens array 151 so as to provide a projector having a light source device which emits light of colors different from each other.

Furthermore, both of the first dichroic mirror 155 and the second dichroic mirror 161 are arranged, thereby enabling red light and green light to be incident in addition to the blue laser light so as to provide a projector having a light source device which emits light of three primary colors.

Moreover, the first diffusion plate 301 and the second diffusion plate 302 have minute irregularities on their surfaces, thereby enabling the first diffusion plate 301 and the second diffusion plate 302 to diffuse laser light so that uniform light source light can be applied to the entire display element 51. Furthermore, the diffusion rate of the first diffusion plate 301 can be reduced in comparison with the case of not using the second diffusion plate 302. Note that, however, the irregularities formed on the surface of the first diffusion plate 301 are larger than the irregularities formed on the surface of the second diffusion plate 302, by which the emission angle of the light emitted from the first diffusion plate 301 is larger than the emission angle of the light emitted from the second diffusion plate 302.

Furthermore, if the condenser lens 172 is installed between the microlens array 151 and the second diffusion plate 302 and the condenser lens 172 is arranged on the microlens array 151 side so that the light condensed by the condenser lens 172 enters the second diffusion plate 302, the spreading of the light beam bundle having passed through the microlens array 151 can be reduced to make the light beam bundle to enter the second diffusion plate 302, thereby enabling the optical system of the light source device 60 in the projector to be easily reduced in size and thereby easily achieving a compact projector.

The aforementioned embodiments are presented as exemplary embodiments and do not intend to limit the scope of the invention. These new embodiments can be carried out in various other forms, and various omissions, substitutions, and alterations can be made without deviating from the gist of the invention. These embodiments and modifications thereof are included in the scope and gist of the invention and also included in the invention described in the claims and equivalents thereof.

What is claimed is:

1. A projector comprising:
   a light source formed by a laser light emitting element;
   a first diffusion plate which light emitted from the light source is made to enter;
   a microlens array which light having passed through the first diffusion plate is made to enter;
   a display element which generates image light; and
   a second diffusion plate which is provided between the microlens array and the display element and is located nearer the display element than the microlens array, and which diffuses the light having passed through the microlens array.

2. The projector according to claim 1, wherein a diffusion angle of the first diffusion plate is larger than a diffusion angle of the second diffusion plate.

3. The projector according to claim 2, wherein:
   the light having passed through the microlens array passes through a condenser lens; and
   a dichroic mirror as an optical axis synthesizer is further provided on an incident side of the microlens array.

4. The projector according to claim 3, wherein the dichroic mirror comprises two dichroic mirrors.

5. The projector according to claim 2, wherein each of the first diffusion plate and the second diffusion plate has minute irregularities on its surface.

6. The projector according to claim 1, wherein:
   the light having passed through the microlens array passes through a condenser lens; and
   a dichroic mirror as an optical axis synthesizer is further provided on an incident side of the microlens array.

7. The projector according to claim 6, wherein the dichroic mirror comprises two dichroic mirrors.

8. The projector according to claim 6, wherein the condenser lens is installed between the microlens array and the second diffusion plate.

9. The projector according to claim 1, wherein each of the first diffusion plate and the second diffusion plate has minute irregularities on its surface.

10. The projector according to claim 1, further comprising:
    a projection-side optical system which projects the image light emitted from the display element on a screen; and
    projector control means for controlling the light source device and the display element.

11. A projector comprising:
    a light source formed by a laser light emitting element;
    a first diffusion plate which light emitted from the light source is made to enter;
    a microlens array which light having passed through the first diffusion plate is made to enter; and
    a second diffusion plate which diffuses the light having passed through the microlens array,
    wherein a diffusion angle of the first diffusion plate is larger than a diffusion angle of the second diffusion plate.

12. The projector according to claim 11, wherein:
    the light having passed through the microlens array passes through a condenser lens; and
    a dichroic mirror as an optical axis synthesizer is further provided on an incident side of the microlens array.

13. The projector according to claim 12, wherein the dichroic mirror comprises two dichroic mirrors.

14. The projector according to claim 12, wherein the condenser lens is installed between the microlens array and the second diffusion plate.

15. The projector according to claim 11, wherein each of the first diffusion plate and the second diffusion plate has minute irregularities on its surface.

16. The projector according to claim 11, further comprising a display element which generates image light, wherein:
    the second diffusion plate is provided between the microlens array and the display element; and
    the second diffusion plate is located nearer the display element than the microlens array.

17. The projector according to claim 16, further comprising:
    a projection-side optical system which projects the image light emitted from the display element on a screen; and
    projector control means for controlling the light source device and the display element.

* * * * *